(12) United States Patent
Kolpak et al.

(10) Patent No.: US 7,917,506 B2
(45) Date of Patent: Mar. 29, 2011

(54) METHOD AND APPARATUS FOR STORING RELATIONSHIP DATA FOR ACCOUNTS AND CONTACTS

(75) Inventors: Jeremy M. Kolpak, Kirkland, WA (US); Veronica Y. Law, Kirkland, WA (US); Yunqi Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 11/056,791

(22) Filed: Feb. 11, 2005

(65) Prior Publication Data

US 2006/0184506 A1 Aug. 17, 2006

(51) Int. Cl.
*G06F 7/00* (2006.01)
*G06F 17/30* (2006.01)
*G06Q 30/00* (2006.01)

(52) U.S. Cl. ............................ 707/736; 707/769; 705/26
(58) Field of Classification Search .................. None
See application file for complete search history.

(56) References Cited

U.S. PATENT DOCUMENTS

| 6,513,020 | B1 * | 1/2003 | Weiss et al. ............... 705/36 R |
| 7,181,419 | B1 * | 2/2007 | Mesaros ..................... 705/26 |
| 2003/0055754 | A1 * | 3/2003 | Sullivan ..................... 705/31 |
| 2003/0055822 | A1 * | 3/2003 | Yu .............................. 707/6 |

OTHER PUBLICATIONS pp. 15-17 from "Data Management using Access" (hereafter "Chua") published by Yang Liang Chua in 2003 and archived on Mar. 29, 2004 at: http://web.archive.org/web/20040329093048/http://dolphin.upenn.edu/~ychua/Fall03/Access+2+Session+Notes.pdf.*
2003 definition of "query" at: http://web.archive.org/web/20050208033839/http://www.webopedia.com/TERM/q/query.html.*

* cited by examiner

*Primary Examiner* — Charles Rones
*Assistant Examiner* — Harold A Hotelling
(74) *Attorney, Agent, or Firm* — Marshall, Gerstein, Borun LLP

(57) ABSTRACT

A method of storing data related to a first entity in a relationship and a second entity in the relationship in a database is disclosed. The method may include entering a name description of the second entity in the relationship into a second converse relationship field of a relationship entity, storing the name description of the second entity entered in the second converse relationship field of the relationship entity, storing a name description of the first entity in the relationship into a first converse relationship field of a relationship entity, allowing access to the stored name description of the second entity stored in the second converse relationship field of the relationship entity by accessing the first entity in the relationship and allowing access to the stored name description of the first entity stored in the first converse relationship field of the relationship entity by accessing the second entity in the relationship.

5 Claims, 4 Drawing Sheets

METHOD AND APPARATUS FOR STORING RELATIONSHIP DATA FOR ACCOUNTS AND CONTACTS

BACKGROUND

Customer relationship management (CRM) systems have made great strides in helping business track important details about accounts, contacts and other relevant acquaintances. However, some important details which may have been known have not always been included in a CRM system. In addition, the relevant data may be stored in the CRM system somewhere but not in a place that is useful to users because it is not obvious to users that such information is available or it had to be entered repeatedly in every relevant location.

SUMMARY

A method of storing data related to a first entity in a relationship and a second entity in the relationship in a database is disclosed. The method may include entering a name description of the second entity in the relationship into a second converse relationship field of a relationship entity, storing the name description of the second entity entered in the second converse relationship field of the relationship entity, storing a name description of the first entity in the relationship into a first converse relationship field of a relationship entity, allowing access to the stored name description of the second entity stored in the second converse relationship field of the relationship entity by accessing the first entity in the relationship and allowing access to the stored name description of the first entity stored in the first converse relationship field of the relationship entity by accessing the second entity in the relationship.

The method may also include entering a role description of the second entity in the relationship into a second role field of the relationship entity, storing the role description of the second entity entered in the second role field of the relationship entity, storing a role description of the first entity in the relationship into a first role field of a relationship entity wherein the first customer role description and second customer role decision are role descriptions of the two roles in the relationship, allowing access to the stored role description of the second entity stored in the second role field of the relationship entity by accessing the first entity in the relationship and allowing access to the stored role description of the first entity stored in the first role field of the relationship entity by accessing the second entity in the relationship.

The method may further include entering a description of the second entity in the relationship into a second description field of the relationship entity, storing the description of the second entity entered in the second description field of the relationship entity, storing a description of the first entity in the relationship into a first description field of a relationship entity wherein the first description and second description are descriptions of the details of the relationship between the two sides of the relationship, allowing access to the stored description of the second entity stored in the second description field of the relationship entity by accessing the first entity in the relationship and allowing access to the stored description of the first entity stored in the first description field of the relationship entity by accessing the second entity in the relationship. The method may also include storing the opposite side of the role field for the second entity in the relationship in the role field of the first entity in the relations and storing the opposite side of the description field for the second entity in the relationship in the description field of the first entity in the relationship.

In addition, the entity names, role descriptions and relationship descriptions may be stored in a table and the relationship entity may include a first converse relationship field, a second converse relationship field, a first role field, a second role field, a first relationship field and a second relationship field.

Finally, a computing apparatus with a processor to execute the steps of the method and a computer readable medium with computer program instructions to perform the steps of the method are also disclosed.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
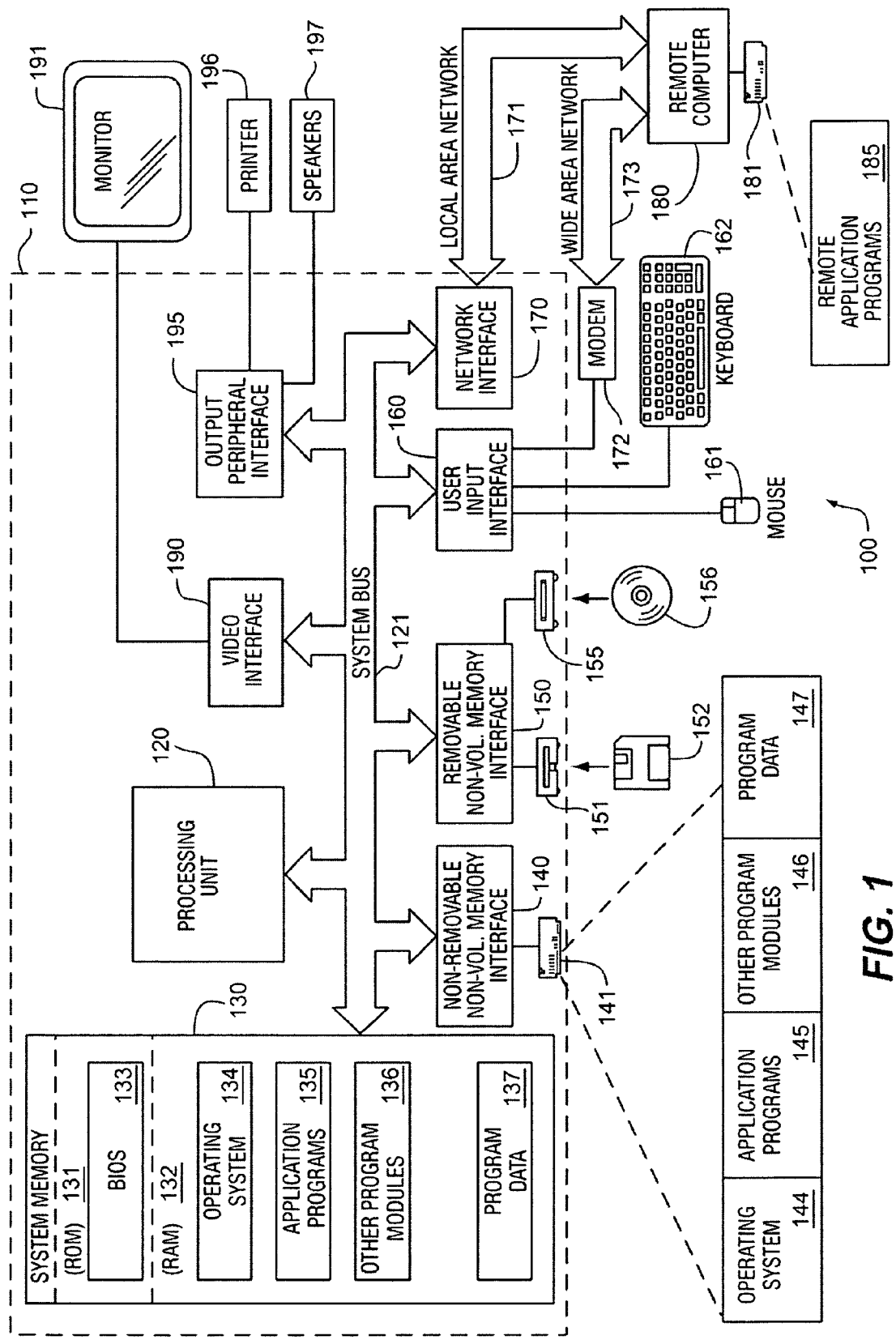
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
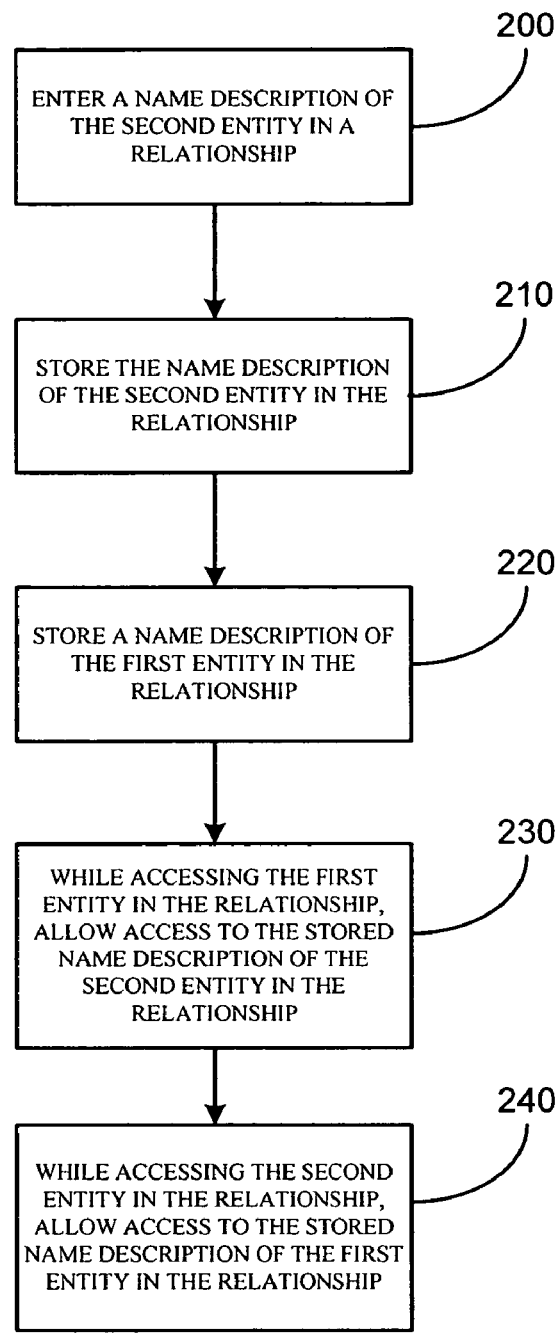
FIG. 2 is an illustration of a flowchart in accordance with the claims.

FIG. 2 may be an illustration of a flowchart of a method of storing data related to a first entity in a relationship and a second entity in the relationship in a database. In general, the method may allow the entry of relationship details for a first entity of a relationship and the "flip side" or other side of details of the relationship will automatically be stored for the second entity of the relationship or vice versa. The details may include the name of the entity converse to the entity selected (the converse), the role of the entities in the relationship and a description of the entities in the relationship. The relationship information may be stored in a relationship entity which may be a table with fields for information on the various sides of the relationship.

At block 200, a name description of the second entity may be entered in the relationship into a second converse relationship field of a relationship entity. For example, assume Acme uses Lawyer's R Us as its attorneys. Accordingly, Acme will be a client of Lawyer's R Us and Lawyer's R Us will be attorneys for Acme. By selecting Acme, the name of the other party to the relationship, Lawyer's R Us, may be entered in the converse relationship field of a relationship entity. The relationship entity may be specific to the relationship between Acme and Lawyer's R Us.

At block 210, the name description of the second entity entered in the second converse relationship field of the relationship entity may be stored. The name description may be stored in a second converse relationship field in the relationship entity. In the previous example, Lawyer's R Us may be the second entity in the relationship and may be stored in the second converse relationship field of the relationship entity for the Acme-Lawyer's R Us relationship.

At block 220, a name description of the first entity in the relationship into a first converse relationship field of a relationship entity may be stored. The name of the first entity of the relationship may not have to be entered but may be obtained automatically. In the previous example, the first entity may be Acme and as Acme was initially selected, Acme may be stored in the first converse relationship field of the relationship entity for the Acme-Lawyer's R Us relationship.

At block 230, access to the stored name description of the second entity stored in the second converse relationship field of the relationship entity by accessing the first entity in the relationship may be allowed. In the previous example, by accessing the Acme entity, the relationship of Acme may be viewed, including the existence of the relationship with Lawyer's R Us. Additional details of the relationship between Acme and Lawyer's R Us that may be stored in the Acme-Lawyer's R Us relationship entity may be accessed by selecting Lawyer's R Us.

At block 240, access to the stored name description of the first entity stored in the first converse relationship field of the relationship entity by accessing the second entity in the relationship may be allowed. For example, by accessing the account for Lawyer's R Us, relationships of Lawyer's R Us can be accessed, including the relationship with Acme.

Additional information may be added to the relationship entity. For example, a role description of the second entity in the relationship into a second role field of the relationship entity may be entered. The role description of the second entity entered in the second role field of the relationship entity may be stored in the stored in the relationship entity. A role description of the first entity in the relationship may be stored in a first role field of a relationship entity. The first customer role description and second customer role decision may be role descriptions of the two roles in the relationship. For example, in the Acme-Lawyer's R Us example, when Acme has been selected, and the relationship with Lawyer's R Us has been selected, Acme's role may be as a client of Lawyer's R Us while Lawyer's R Us role may be displayed as Attorney. If the Lawyer's R Us description of the role was entered as Attorney, the flip side of that relationship is "client" and the role "client" may be automatically entered for Acme. Similar to accessing the names of parties in relationships, access to the stored role description of the second entity stored in the second role field of the relationship entity by accessing the first entity in the relationship may be allowed and access to the stored role description of the first entity stored in the first role field of the relationship entity by accessing the second entity in the relationship may be allowed. Using the Acme-Lawyer's R Us relationship example, by accessing Acme and selecting to view the relationship with Lawyer's R Us, the customer role of Acme and the partner role of Lawyer's R Us may be obtained.

Even more information may be added to the relationship entity. For example, a description of the second entity in the relationship may be entered into a second description field of the relationship entity. The description of the second entity entered in the second description field of the relationship entity may be stored and a description of the first entity in the relationship may be stored into a first description field of a relationship entity. The first description and second description may be descriptions of the details of the relationship between the two sides of the relationship. Access to the stored description of the second entity stored in the second description field of the relationship entity may be permitted by accessing the first entity in the relationship and access to the stored description of the first entity stored in the first description field of the relationship entity may be permitted by accessing the second entity in the relationship. Using the Acme-Lawyer's R Us relationship example, by accessing Acme and selecting to view the details with Lawyer's R Us, the detailed information of the relationship between Acme and Lawyer's R Us may be obtained. As just one example, Acme may have a first firm for intellectual property matters, a second firm for labor relation matters and a third firm for international shipping matters. A description of Lawyer's R Us may be supplemented with further details that Lawyer's R Us handles intellectual property matters for Acme.

If the opposite side of the details can be determined or has been set up previously, the opposite side of details may be stored automatically. For example, if in the relationship between Acme and Lawyer's R Us, Acme is only listed as a customer, it is unlikely that the opposite side of the relationship can immediately be determined. The question would be Acme is a customer of what specific services.

In addition, if one entity in a relationship is modified or deleted, the corresponding modification or deletion may be made to the second entity in the relationship. For example, assume Lawyer's R Us expands from providing intellectual property services to also providing real estate law services and Acme decides to use Lawyer's R Us for both intellectual property matters and real estate law matters. If Acme updates the entry for Lawyer's R Us to recognize that Lawyer's R Us provides both intellectual property law services and real estate law services, the Layer's R Us entity will be updated to reflect that it provides both real estate and intellectual property law services for Acme. Similarly, assume Lawyer's R Us closes and stops providing services to Acme. Acme may delete Lawyer's R Us. The Lawyer's R Us entity will also be updated to reflect that Lawyer's R Us does not provide any services to Acme.

When an account or contact is merged with another account or contact (in case of duplicates, for example), the relationship record as well as the converse relationship record may be maintained so that there are no duplicate relationship/converse relationship records. For example, say that Account A1 (with role R1) has a relationship with Contact C1 (with role R2). Also assume Account A2 (with role R1) has a relationship with Contact C1 (with role R2). When A2 is merged to A1, the relationship and converse relationship record for (A2, C1) may be deleted from the database as the relationship and converse relationship record for (A1, C1) are already in the system. A more specific example may be that Acme inputs a relationship between Acme and Lawyer's R Us. Lawyer's R Us may change its structure to become a Limited Liability Partnership or LLP and it may change its name to Lawyer's R Us LLP. A relationship may be entered between Acme and Lawyer's R Us LLP. It may make sense to merge Lawyer's R Us and Lawyer's R Us LLP and this merger may delete the relationship and converse relationship record for Lawyer's R Us LLP as the relationship and converse relationship record for Lawyer's R Us is already in the system.

The entity names, role descriptions and relationship descriptions may be stored in a table in the relationship entity. The relationship entity may have a first converse relationship field, a second converse relationship field, a first role field, a second role field, a first relationship field and a second relationship field.

Figure 3:
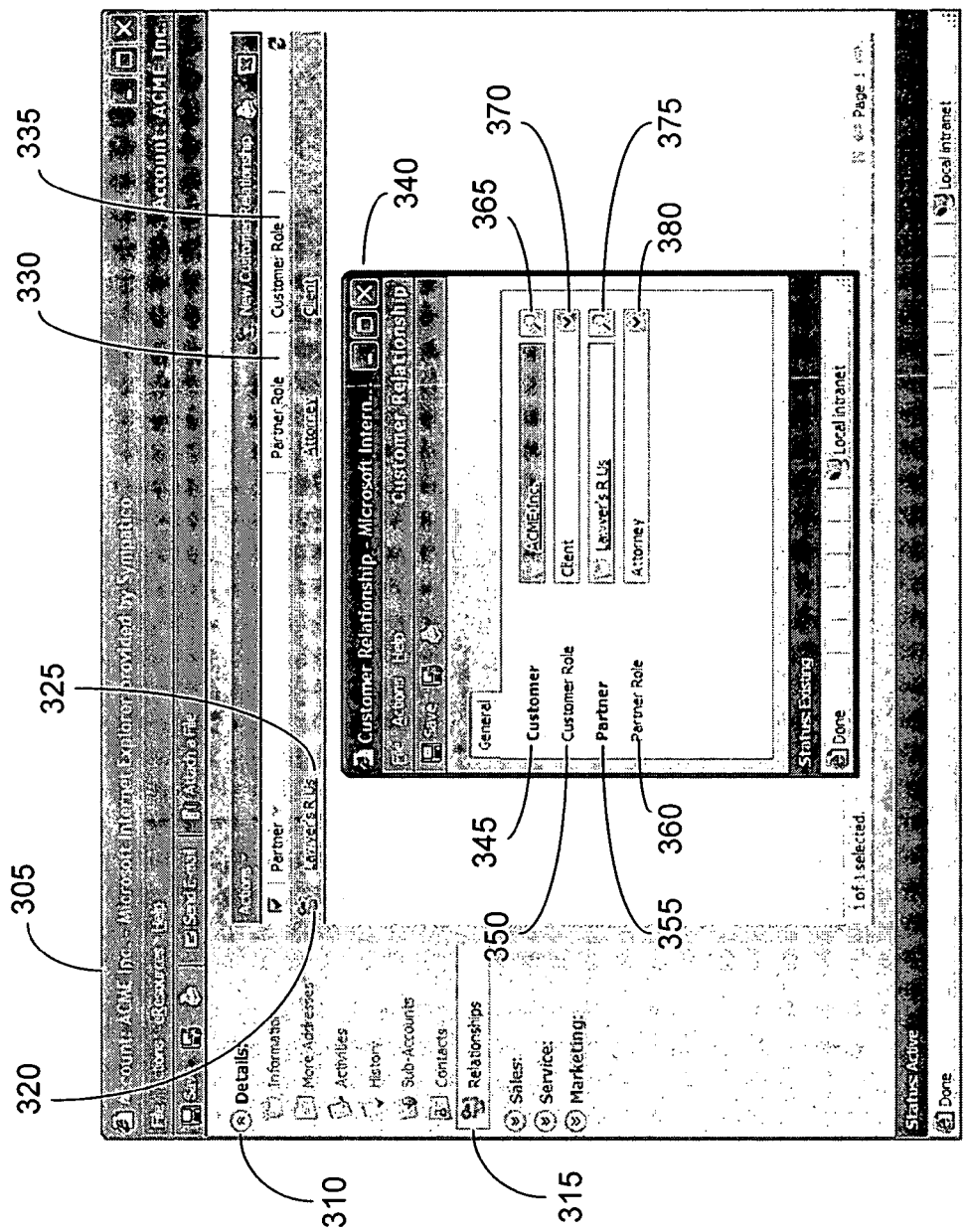
FIG. 3 is an illustration of a display of reviewing the relationships of a first account.
Figure 4:
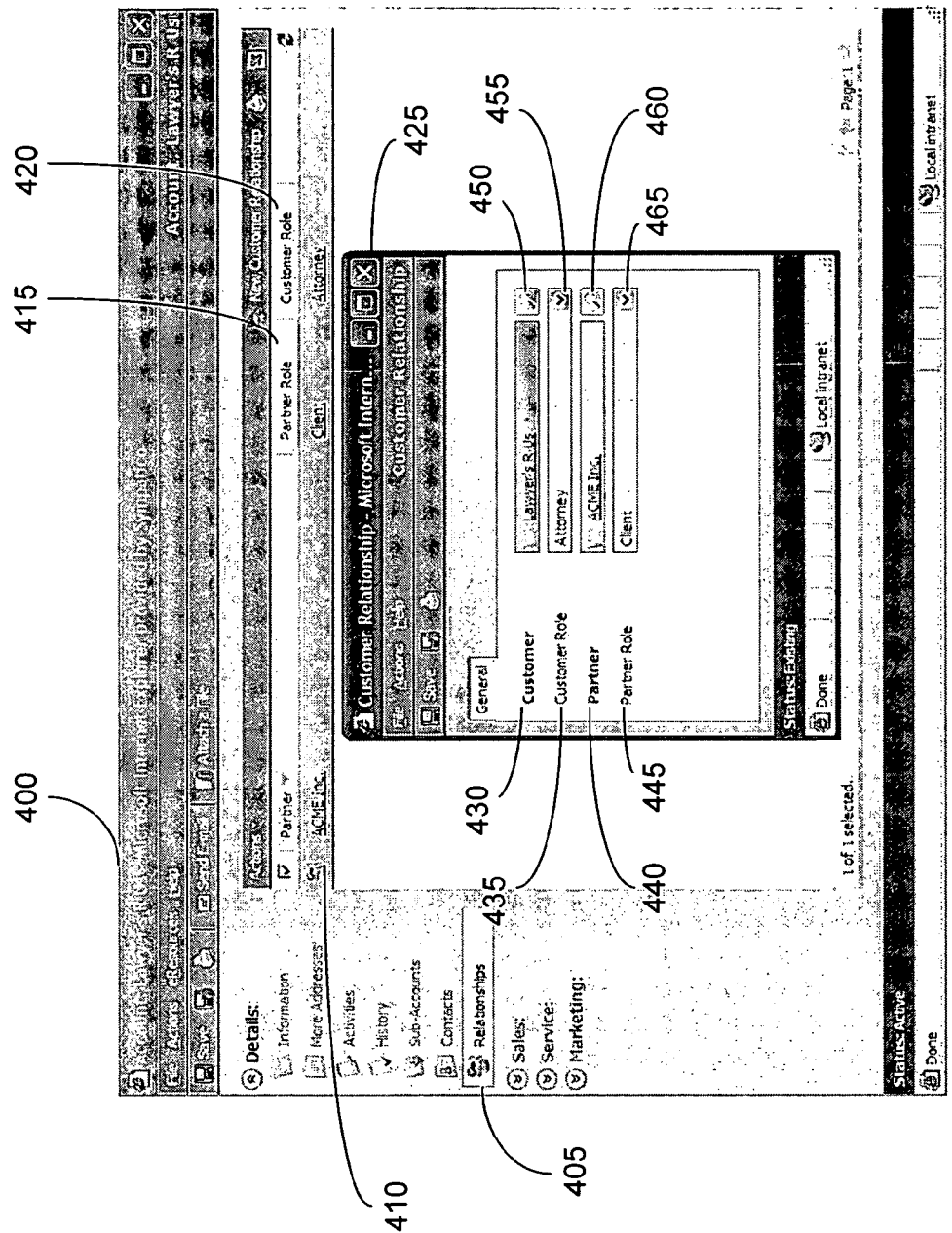
FIG. 4 is an illustration a display of reviewing the relationships of a second account.

FIGS. 3 and 4 may illustrate an example of using the method. FIG. 3 indicates that the account for ACME Inc. 305 is being reviewed. A "Details" tab 305 may have several options related to the entity "Acme," one of which may be "Relationships" 315. By selecting the "Relationships" tab 315, a list of entities with which ACME has a relationship 320 may be displayed. FIG. 3 indicates that ACME only has one relationship, and that is with Lawyer's R Us 325. The list may also indicate the partner role 330 that Lawyer's Are Us has with ACME and the customer role that ACME has with Lawyer's R Us. By selecting one of the displayed relationships 320, further information may be obtained on the selected relationship. The further information may be displayed in a separate pop-up box 340. The relevant information on the relationship is displayed such as the customer 345, the customer role 350, the partner 355 and the partner role 360. This information may be created, modified or viewed from this display 340. The related input boxes 365, 370, 375 and 380 may be drop down boxes or input boxes. Further information on the customer 365 or partner 375 may be displayed by selecting them.

FIG. 4 may illustrate looking at the ACME-Lawyer's R Us relationship by first selecting Lawyer's R Us 400. By selecting the "relationships" tab 405, the relationships for Lawyer's R Us may be displayed 410. The partner role 415 and customer role 420 may also be displayed. By selecting a relationship 410, additional information may be displayed in a separate pop-up box 425. The additional information may be the customer name 430, the customer role 435, the partner name 440 and the partner role 445. This information may be created, modified or viewed from this display 425. The related input boxes 450, 455, 460 and 465 may be drop down boxes or input boxes. Further information on the customer 450 or partner 460 may be displayed by selecting them.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method of storing data related to a first entity in a relationship and a second entity in the relationship in a customer relationship management (CRM) database comprising:
  entering a name description of the second entity in the relationship into a second converse relationship field of a relationship entity wherein the relationship entity comprises a first converse relationship field, a second converse relationship field, a first role field, a second role field, a first relationship field and a second relationship field;
  entering a second role of the second entity in the second role field wherein the second role is the role description of the second role in the relationship;
  entering a second relationship of the second entity in the second relationship field and storing the name description of the second entity entered in the second converse relationship field of the relationship entity as the stored second relationship wherein the second relationship of the second entity describes details of the relationship;
  storing the second role of the second entity entered in the second role field of the relationship entity as the stored second role;
  storing the second relationship of the second entity in the second relationship field of the relationship entity as the stored second relationship;
  storing a name description of the first entity in the relationship into a first converse relationship field of the relationship entity as the stored first name;
  if a flip side of the role of the second entity is known, automatically entering the flip side of the role of the second entity as the first role for the first entity and storing the flip side of the role of the second entity in the first role field of the relationship entity as the stored first role wherein the first role is the role description of the first role in the relationship;

if a flip side of the role of the second entity is not known, storing a role in the first role field as the stored first role;

if a flip side of the relationship of the second entity is known, automatically entering the flip side of the relationship of the second entity as the first relationship as the first relationship for the first entity and storing the flip side of the relationship of the second entity in the first relationship field of the relationship entity as the stored first relationship wherein the first relationship of the first entity describes details of the relationship;

if the flip side of the relationship of the second entity is not known, storing a relationship in the first relationship field as the stored first relationship;

automatically displaying the stored second name description, the stored second role and the stored second relationship of relationship entity by accessing the first entity in the relationship;

automatically displaying the stored first name description, the stored first role and the stored first relationship by accessing the second entity in the relationship;

if the stored first name description is modified, storing the stored first name description as modified as a modified stored first name description and the modified stored first name description is accessed when accessing the second entity;

if the stored second name description is modified, storing the second name description as modified as a modified stored second name description and the modified stored second name description for the second entity is accessed when accessing the first entity;

if the stored first role is modified, storing the stored first role as modified as a modified stored first role and the modified stored first role is accessed when accessing the second entity;

if the stored second role is modified, storing the stored second role as modified as a modified stored second role and the modified stored second role is accessed when accessing the first entity;

if the stored first description is modified, the stored first name description as modified is stored as a modified stored first description and the modified stored first name is accessed when accessing the second entity;

if the stored second name description is modified, the stored second name description as modified is stored as a modified stored second name description the modified stored second name description is accessed when accessing the second entity;

if the first entity is selected, retrieving first entity relationships of which the first entity is a part and displaying the first entity relationship; and if the second entity is selected; retrieving second entity relationships of which the second entity is a part and displaying the second entity relationship.

2. The method of claim 1, wherein the entity names, role descriptions and relationship descriptions are stored in a table.

3. A computing apparatus, comprising:

a display unit that is configured to generate video images;

an input device;

a processing apparatus operatively coupled to said display unit and said input device, said processing apparatus comprising a processor and a memory operatively coupled to said processor, a network interface connected to a network and to the processing apparatus;

said processing apparatus being programmed to allow entry of a name description of a second entity in a relationship in a customer relationship management (CRM) system into a second converse relationship field of a relationship entity wherein the relationship entity comprises a first converse relationship field, a second converse relationship field, a first role field, a second role field, a first relationship field and a second relationship field;

said processing apparatus being programmed to allow entry of a second role of the second entity in the second role field wherein the second role is the role description of the second role in the relationship;

said processing apparatus being programmed to allow entry of a second relationship of the second entity in the second relationship field and to store the name description of the second entity entered in the second converse relationship field of the relationship entity as the stored second relationship wherein the second relationship of the second entity describes details of the relationship;

said processing apparatus being programmed to store the second role of the second entity entered in the second role field of the relationship entity as the stored second role;

said processing apparatus being programmed to store the second relationship of the second entity entered in the second relationship field of the relationship entity as the stored second relationship;

said processing apparatus being programmed store a name description of the first entity in the relationship into a first converse relationship field of a relationship entity as the stored first name;

if a flip side of the role of the second entity is known, said processing apparatus being programmed to automatically enter the flip side of the role of the second entity as the first role for the first entity and store the flip side of the role of the second entity in the first role field of the relationship entity as the stored first role wherein the first role is the role description of the first role in the relationship;

if a flip side of the role of the second entity is not known, said processing apparatus being programmed to store a role in the first role field as the stored first role;

if a flip side of the relationship of the second entity is known, said processing apparatus being programmed to automatically enter the flip side of the relationship of the second entity as the first relationship as the first relationship for the first entity and store the flip side of the relationship of the second entity in the first relationship field of the relationship entity as the stored first relationship wherein the first relationship of the first entity describes details of the relationship;

if the flip side of the relationship of the second entity is not known, said processing apparatus being programmed to store a relationship in the first relationship field as the stored first relationship;

said processing apparatus being programmed to automatically display the stored second name description, the stored second role and the stored second relationship of the relationship entity by accessing the first entity in the relationship;

said processing apparatus being programmed to automatically display the stored first name description, the stored first role and the stored first relationship by accessing the second entity in the relationship;

if the stored first name description is modified, said processing apparatus being programmed to store the stored first name description as modified as a modified stored first name description and allow the stored first name description to be available for access when accessing the second entity;

if the stored second name description for is modified, said processing apparatus being programmed to store the second name description as modified as a modified stored second name description and to allow the modified stored second name description to be available for access when accessing the first entity;

if the stored first role is modified, said processing apparatus being programmed to store the stored first role as modified as a modified stored first role and to access the modified stored first role when accessing the second entity;

if the stored second role is modified, said processing apparatus being programmed to store the stored second role as modified as a modified stored second role and to access the modified stored second role when accessing the first entity;

if the stored first description is modified, said processing apparatus being programmed to store the stored first name description as modified as a modified stored first description and to access the modified stored first name when accessing the second entity;

if the stored second name description is modified, said processing apparatus being programmed to store the stored second name description as modified as a modified stored second name description and to access the modified stored second name description when accessing the second entity;

if the first entity is selected, said processing apparatus being programmed to retrieve first entity relationships of which the first entity is a part and display the first entity relationship; and if the second entity is selected, said processing apparatus being programmed to retrieve second entity relationships of which the second entity is a part and display the second entity relationship.

4. The computing apparatus of claim 3, wherein the entity names, role descriptions and relationship descriptions are stored in a table.

5. A computer storage medium having computer executable instructions for performing a method of storing data related to a first entity in a relationship and a second entity in the relationship in a customer relationship management (CRM) database comprising:

computer executable instructions for entering a name description of the second entity in the relationship into a second converse relationship field of a relationship entity wherein the relationship entity comprises a first converse relationship field, a second converse relationship field, a first role field, a second role field, a first relationship field and a second relationship field;

computer executable instructions for allowing entry of a second role of the second entity in the second role field wherein the second role is the role description of the second role in the relationship;

computer executable instructions for entering a second relationship of the second entity in the second relationship field and storing the name description of the second entity entered in the second converse relationship field of the relationship entity as the stored second relationship wherein the second relationship of the second entity describes details of the relationship;

computer executable instructions for storing the second role of the second entity entered in the second role field of the relationship entity as the stored second role;

computer executable instructions for storing the second relationship of the second entity in the second relationship field of the relationship entity as the stored second relationship;

computer executable instructions for storing a name description of the first entity in the relationship into a first converse relationship field of the relationship entity as the stored first name;

if a flip side of the role of the second entity is known, computer executable instructions for automatically entering the flip side of the role of the second entity as the first role for the first entity and storing the flip side of the role of the second entity in the first role field of the relationship entity as the stored first role wherein the first role is the role description of the first role in the relationship;

if a flip side of the role of the second entity is not known, computer executable instructions for storing a role in the first role field as the stored first role;

if a flip side of the relationship of the second entity is known, computer executable instructions for automatically entering the flip side of the relationship of the second entity as the first relationship as the first relationship for the first entity and storing the flip side of the relationship of the second entity in the first relationship field of the relationship entity as the stored first relationship wherein the first relationship of the first entity describes details of the relationship;

if the flip side of the relationship of the second entity is not known, computer executable instructions for storing a relationship in the first relationship field as the stored first relationship;

computer executable instructions for automatically displaying the stored second name description, the stored second role and the stored second relationship of relationship entity by accessing the first entity in the relationship;

computer executable instructions for automatically displaying the stored first name description, the stored first role and the stored first relationship by accessing the second entity in the relationship;

if the stored first name description is modified, computer executable instructions for storing the stored first name description as modified as a modified stored first name description and the modified stored first name description is accessed when accessing the second entity;

if the stored second name description is modified, computer executable instructions for storing the second name description as modified as a modified stored second name description and the modified stored second name description for the second entity is accessed when accessing the first entity;

if the stored first role is modified, computer executable instructions for storing the stored first role as modified as a modified stored first role and accessing the modified stored first role when accessing the second entity;

if the stored second role is modified, computer executable instructions for storing the stored second role as modified as a modified stored second role and accessing the modified stored second role when accessing the first entity;

if the stored first description is modified, computer executable instructions for storing the stored first name description as modified as a modified stored first description and accessing the modified stored first name when accessing the second entity;
if the stored second name description is modified, computer executable instructions for storing the stored second name description as modified as a modified stored second name description and accessing the modified stored second name description when accessing the second entity;
if the first entity is selected, computer executable instructions for retrieving first entity relationships of which the first entity is a part and displaying the first entity relationship; and
if the second entity is selected; computer executable instructions for retrieving second entity relationships of which the second entity is a part and displaying the second entity relationship.

* * * * *